United States Patent

Troyer

[15] 3,650,062
[45] Mar. 21, 1972

[54] FISHING LURE

[72] Inventor: Milo C. Troyer, Route 3, Albion, Ind. 46901

[22] Filed: Dec. 22, 1969

[21] Appl. No.: 886,896

Related U.S. Application Data

[63] Continuation-in-part of Ser. No. 679,849, Nov. 1, 1967, abandoned.

[52] U.S. Cl. ........................................................43/42.06
[51] Int. Cl. ...............................................................A01k 85/00
[58] Field of Search ...............43/42.06, 42.05, 42.36, 42.48, 43/42.35, 41

[56] References Cited

UNITED STATES PATENTS

| | | |
|---|---|---|
| 2,176,803 | 10/1939 | Rosselle...........................43/42.06 |
| 2,229,239 | 1/1941 | Davis...............................43/42.06 |
| 2,494,093 | 1/1950 | Hill.................................43/42.48 |
| 2,557,577 | 6/1951 | Soma...............................43/41 |
| 2,569,465 | 10/1951 | Farr.................................43/42.06 |
| 2,846,805 | 8/1958 | Waitzman..........................43/42.06 |
| 2,944,362 | 7/1960 | Kreeger............................43/42.06 |

Primary Examiner—Hugh R. Chamblee
Attorney—Oltsch & Knoblock

[57] ABSTRACT

A fishing lure having a tubular body with a bore therethrough. The tubular body has a transverse end face extending obliquely to the axis of the body and defining a water-reaction surface which materially influences the fish-alluring movement of the lure as it is pulled through the water.

18 Claims, 16 Drawing Figures

PATENTED MAR 21 1972
3,650,062
SHEET 1 OF 2
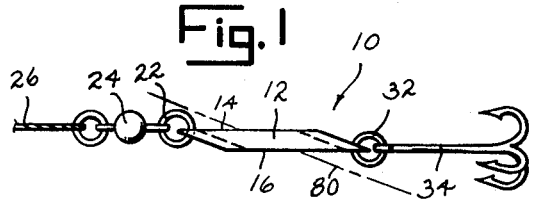
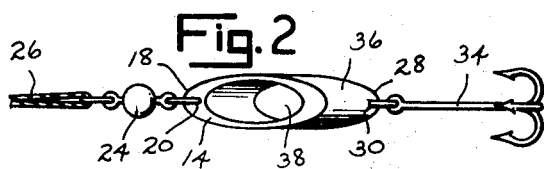
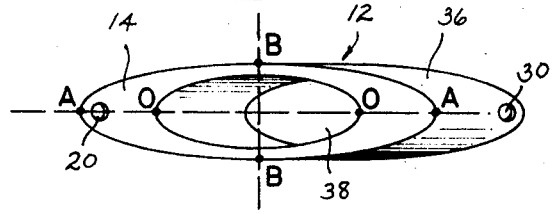
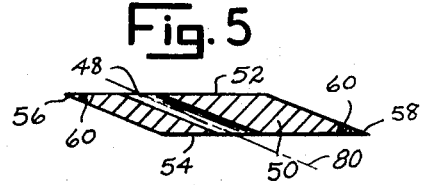
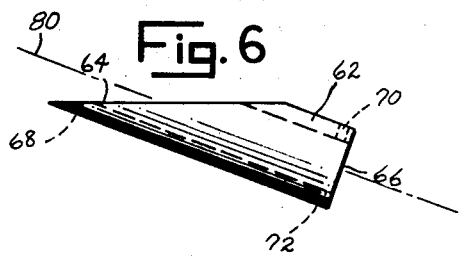
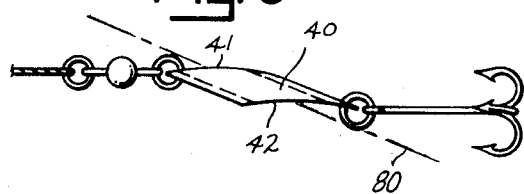
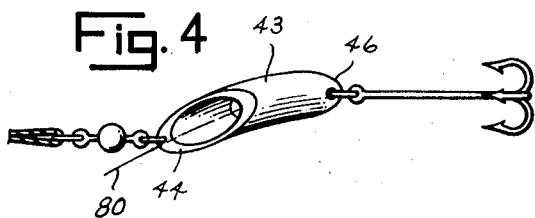
INVENTOR.
MILO C. TROYER
BY Oltsch & Knoblock
ATTORNEYS

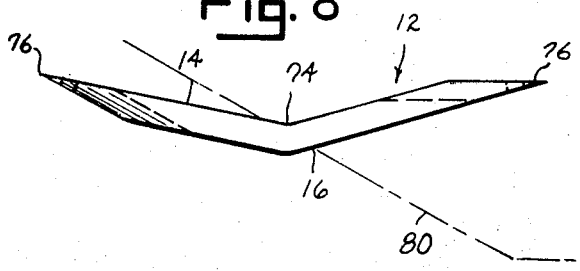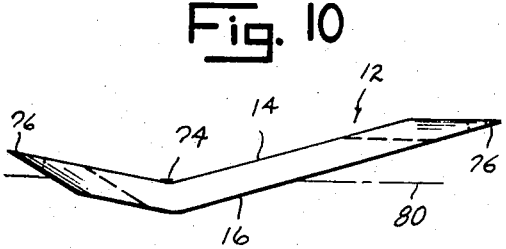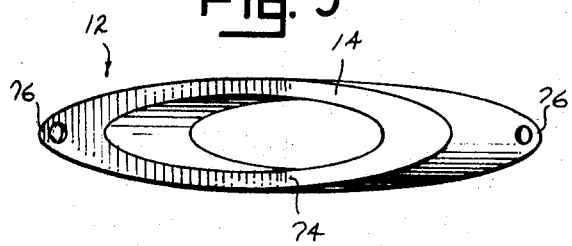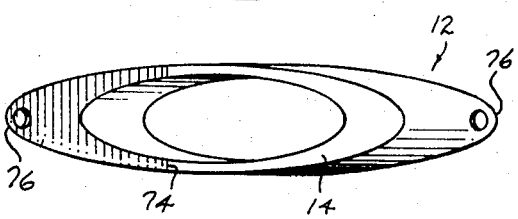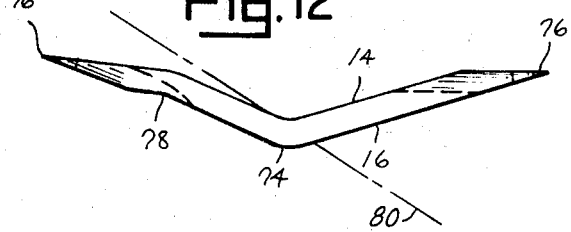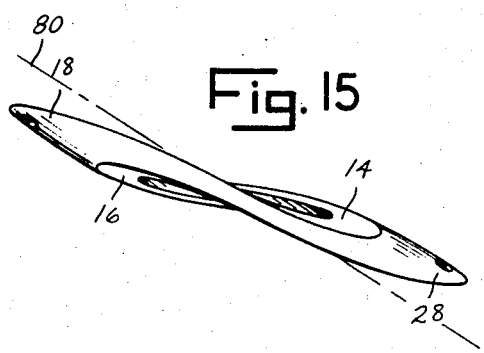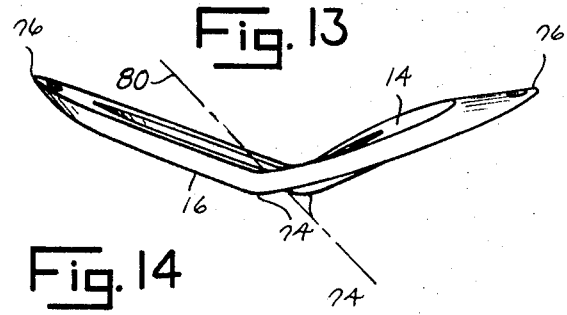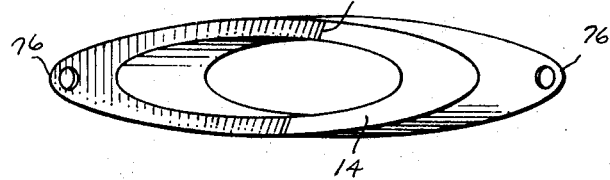

FISHING LURE

CROSS REFERENCE TO RELATED APPLICATION

This application is a continuation-in-part of my U.S. application Ser. No. 679,849, filed Nov. 1 1967, now abandoned.

BACKGROUND OF THE INVENTION

This invention pertains to the field of fishing lures.

Some of the prior art, such as U.S. Pat. Nos. 2,944,362; 2,846,805; and 2,817,180 concerns tubular fishing lures having a bore and containing structural obstructions within the bore to control the motion of the lure or to protect the hook of the fishing lure from becoming snarled with weeds or buck strips. These obstructions add to the cost of the lure and damp or otherwise affect the action of the lure.

Some lures, such as those described in U.S. Pat. Nos. 2,569,465; 2,659,995; and 2,494,093 have bodies constructed of light weight, thin tubular material. Other types of fishing lures, such as those described in U.S. Pat. No. 2,766,544, are of the plug variety which simulate small fish, frogs or other types of bait and which include an axial bore therethrough.

SUMMARY OF THE INVENTION

This invention pertains to a fishing lure having a tubular body with a bore, which is preferably unobstructed, therethrough. An exteriorly positioned fish hook and line swivel are attached at opposite ends of the tubular body preferably in such a manner that a line extending between them extends in an angle to the axis of the tubular body. The tubular body of the lure is preferably of appreciable thickness and includes at least one transverse end face having sufficient surface area to create an effective water-reactive surface which contributes materially to the action of the lure. Additionally, the lure body, when having two transverse end faces, may be sent across the end faces to vary the plane of the end faces and affect lure action.

Accordingly, it is an objective of this invention to provide an effective, attractive and economical fish lure.

It is another object of this invention to provide a fish lure having novel underwater action.

It is still another object of this invention to provide a fish lure of tubular configuration and having at least one end face which reacts with the water as the lure is being pulled therethrough to constantly change the depth and direction of the lure.

Other objects of this invention will become apparent upon a reading of the invention's description.

BRIEF DESCRIPTION OF THE DRAWINGS

FIG. 1 is a view of an embodiment of this invention.

FIG. 2 is a top plan view of the lure illustrated in FIG. 1.

FIG. 2a is a plan view of an end face of the lure body illustrated in FIG. 1.

FIG. 3 is a modification of the lure shown in FIG. 1.

FIG. 4 is a view of another embodiment of this invention.

FIG. 5 is a sectional view of a lure body forming another embodiment of this invention.

FIG. 6 is a view of a lure body forming another embodiment of this invention.

FIG. 7 is a top plan view of the lure body illustrated in FIG. 6.

FIG. 8 is a view of the lure body illustrated in FIG. 1 shown in modified form.

FIG. 9 is a top plan view of the lure body illustrated in FIG. 8.

FIG. 10 is a view of the lure body illustrated in FIG. 1 shown in another modified form.

FIG. 11 is a top plan view of the lure body illustrated in FIG. 10.

FIG. 12 is a view of the lure body illustrated in FIG. 8 shown in modified form.

FIG. 13 is a view of the lure body illustrated in FIG. 1 shown in another modified form.

FIG. 14 is a top plan view of the lure body illustrated in FIG. 13.

FIG. 15 is a view of the lure body illustrated in FIG. 1 shown in modified form.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and the application and practical use to thereby enable others skilled in the art to best utilize the invention.

The lure bodies of this invention may be formed from tubular stock having a circular, square, polygonal, or other similar cross section. Referring to FIGS. 1 and 2, the fishing lure 10 illustrated therein includes a tubular body 12 which may consist either of a metal or plastic material and which is preferably highly reflective Body 12 has transversely positioned end faces 14 and 16 extending obliquely to the axis 80 of the body and preferably lying in substantially parallel planes. End faces 14 and 16 intersect the axis 80 of body 12 at an angle other than 90° and preferably less than 45°. Thus, this angle of intersection of end faces 14 and 16 to the body axis 80 may vary from 10° to 40° and preferably is between 20° and 30°. The distance between faces 14 and 16 is preferably less than the outer diameter of body 12. At one lip or end part 18 of the body is an aperture 20 through which an eyelet 22 is anchored. One end of a swivel 24 may be attached to eyelet 22 and the opposite end of the swivel may be attached to a line 26. At an opposite lip or end part 28 of body 12 is an aperture 30. An eyelet 32 may be attached to the body at aperture 30 and thus serve to connect a fishing hook 34 to the lure. Fishing hook 34 may have a single barb or may consist of a plurality of barbs.

End faces 14 and 16 of lure 10 define surfaces against which the water reacts as the lure is pulled through the water. These surfaces are of sufficient size to contribute materially to the action or behavior of the lure as it is pulled through the water. In FIG. 2A an enlarged plan view of an end face of body 12, illustrated as end face 14, is shown. It is important to note that end face 14 is generally elongated and is defined in part by a major outer diameter A—A and a transverse minor outer diameter B—B. The width of the end face adjacent each end thereof as measured from the outer surface 36 to bore 38 of the lure body along its major outer diameter and designated A-O is substantially greater than the thickness of the lure body and is preferably at least one-fourth the diameter of the body.

FIG. 3 illustrates another embodiment of this invention wherein the lure includes a tubular body 40 having transverse end faces 41 and 42 extending obliquely of the axis 80 of the body. End faces 41 and 42 are preferably substantially parallel and lie in planes which are arced or curved.

FIG. 4 shows still another embodiment of this invention in which lure body 43 has a curved axis and opposed oblique end faces 44 and 46 which are parallel and disposed at slight angles to each other. End faces 44 and 46 may be formed in any selected relation to the curved axis 80 of the tube.

FIG. 5 depicts still another variation of the subject invention wherein bore 48 is eccentrically positioned within lure body 50. End faces 52 and 54 extend obliquely to the axis 80 of the lure body and preferably lie in planes which are substantially parallel and intersect the body at an angle between 20° and 30°. Opposite lips or end parts 56 and 58 of the lure body 50 are apertured at 60 to receive eyelets or other means for attaching a hook and line as previously explained.

FIGS. 6 and 7 illustrate another embodiment of this invention in which tubular lure body 62 includes an end face 64 which extends obliquely at an angle preferably less than 45° to the axis 80 of the body. An opposite end face 66 may be substantially perpendicular to the body axis 80. An aperture 68 adapted to receive an eyelet (not shown) may be formed in the lip defined in part by end face 64. Body 62 may have a second aperture 70 formed therein adjacent end face 66 at the opposite side of the body from aperture 68. Another aperture 72 may be formed in body 62 adjacent end face 66 and opposite aperture 70 so as to provide an optional place at which to attach a fishing line or hook.

FIGS. 8, 9, 10, and 11 are illustrative of modifications of the lure embodiment shown in FIG. 1. In these modified embodiments, the body 12 of the lure illustrated in FIG. 1 has a transverse bend 74 formed therein across end faces 14 and 16 and intermediate ends 76 of the lure body. End faces 14 and 16 of the lure body are substantially V-shaped with an included angle of approximately 90° to 175° and preferably 150° formed between the sides of each end face. Although the lure body of these embodiments may be formed from thin walled tubular material, it is preferable that the lure body be formed from thick walled tubular material having opposite end faces which are of the dimensions described relative to FIG. 2A with bend 74 paralleling the minor outer diameters of the end faces. Bend 74 in the lure body may be formed approximately midway between ends 76, as shown in FIGS. 8 and 9, or formed closer to one end 76 than the opposite end 76, as illustrated in FIGS., 10 and 11. A lure constructed from the lure body illustrated in FIGS. 8 and 9 will have more of a pronounced oscillatory or rocking action than the lure illustrated in FIGS. 1 and 2. A lure constructed from the lure body in FIGS. 10 and 11 will oscillate in a similar fashion as the lure in FIGS. 8 and 9 but at varying frequencies depending upon which end of the lure the line is attached. Thus, the lure body of FIGS. 10 and 11 will permit the fisherman to select which ends of the body to attach the hook and line depending upon the type of oscillatory action he desires.

The lure body illustrated in FIG. 12 is similar to the body shown in FIGS. 8 and 9 but with a return bend 78 formed therein which preferably parallels bend 74. The lure body illustrated in FIGS. 13 and 14 is also similar to the lure body of FIGS. 8 and 9 with the exception that bend 74 therein does not parallel the minor outer diameter of the end faces thereof but instead is oblique thereto as shown. A lure constructed from the lure body illustrated in FIGS. 13 and 14 will experience a rotative as well as oscillatory motion.

FIG. 15 is illustrative of the lure body shown in FIG. 1 having the end parts 18 and 28 thereof twisted along the axis 80 of the lure out of radial alignment. This type of lure will experience a rotative-type motion as it is drawn through the water.

The aforementioned embodiments are not intended to be exhaustive. Depending upon the type of action of the lure desired, the physical properties of the tubular body may be varied in any one of the following ways:

1. By selecting the wall thickness of the body desired;
2. By providing a body with a bore eccentric to any selected extent or degree;
3. By selecting a body with an axis of selected curvature and providing oblique end faces in selected relation to the curved axis;
4. By forming the body end portions with edges of selected contour; and
5. By selecting the angle of the body end faces with respect to the axis of the body and to each other.

Although the physical characteristics of the lure may be varied in the aforementioned ways, certain characteristics are common in each embodiment of this invention. The lure body is constructed preferably of tubular stock, which may be circular, square or polygonal; the bore of the body is preferably unobstructed and of constant cross section. At least one end portion of the body has a transverse end face extending obliquely to the axis of the body.

By forming the lure in accordance with this invention, a very lively action is produced. This action may consist of the following basic movements: a vertical rocking motion of the lure about a longitudinal axis defined by an imaginary line interconnecting the point of line attachment and the point of hook attachment on the body; a swinging or lateral movement of the rear of the lure relative to the line attachment point; a rotative movement; and infinite combinations of these actions. The amplitude and rate of the lure action depends upon the trolling speed and water conditions, with the amplitude decreasing and the rate increasing as the trolling speed increases. Still another important movement of the lure is the darting action which involves abrupt changes in the lure heading of relatively large amplitude and in different lateral and vertical directions. In combination with these movements may be a slight rolling of the lure about the axis of pull thereof.

It will be understood that the invention is not to be limited to the details herein given but it may be modified within the scope of the appended claims.

What I claim is:

1. A fish lure comprising: a tubular body with an outer surface having a bore of substantially constant cross section through said body and a longitudinal axis through said bore, said body having a transverse end face extending obliquely to said axis of the body, said end face being generally elongated and defined in part by a major outer diameter and a transverse minor outer diameter, the width of said end face as measured along the major outer diameter of said end face from the point of intersection of the outer surface of the body with the plane of the end face at said major outer diameter to said bore being at least one-fourth of the minor outer diameter of said end face so as to materially influence the fish-alluring movement of said lure as the lure is pulled through the water, said body having first and second ends, a fish hook exteriorly positioned and attached to the first end of said body, and means for attachment of a line to the second end of said body.

2. The fish lure of claim 1, wherein said end face lies in a flat plane.

3. The fish lure of claim 1, wherein said end face has a curved contour.

4. The fish lure of claim 1, wherein said first end of the body is defined in part by said end face.

5. The fish lure of claim 4, wherein said line attachment means is obliquely displaced from said fish hook.

6. The fish lure of claim 1, wherein said bore is eccentrically positioned within said body.

7. The fish lure of claim 1, wherein said body has a curved longitudinal axis.

8. The fish lure of claim 1, having another said end face and wherein said end faces are displaced from 10° to 40° from the axis of the body.

9. The fish lure of claim 8, wherein said end faces are generally parallel.

10. The fish lure of claim 8, wherein said body has a bend formed therein intermediate its first and second ends and across at least one of said end faces.

11. The fish lure of claim 10, wherein said one end face is substantially V-shaped.

12. The fish lure of claim 10, wherein said bend is located approximately midway between the first and second ends of said body.

13. The fish lure of claim 10, wherein said bend substantially parallels the minor outer diameter of said one end face.

14. The fish lure of claim 10, wherein said bend extends obliquely to the minor outer diameter of said one end face.

15. The fish lure of claim 10, wherein said body has a return bend formed therein across at least one of said end faces between one of said first and second ends of said body and said first mentioned bend.

16. The fish lure of claim 1, wherein said body is twisted about an axis extending through said first and second ends of the body.

17. The fish lure of claim 1, having another said end face and wherein said body has such an axial dimension and said end faces are so angularly displaced from said body axis that observation of the lure in a line of sight normal to one end face reveals a part of the bore opening defined by the other end face.

18. The fish lure of claim 1, wherein said bore is eccentrically positioned within said body.